(12) United States Patent
Chatterjee et al.

(10) Patent No.: US 9,745,432 B2
(45) Date of Patent: Aug. 29, 2017

(54) ANION EXCHANGE MEMBRANE FOR ELECTRODIALYSIS APPLICATIONS AND PROCESS FOR THE PREPARATION THEREOF

(71) Applicant: COUNCIL OF SCIENTIFIC & INDUSTRIAL RESEARCH, New Delhi (IN)

(72) Inventors: Uma Chatterjee, Bhavnagar (IN); Suresh Kumar Jewrajka, Bhavnagar (IN); Sreekumaran Thampy, Bhavnagar (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 0 days.

(21) Appl. No.: 14/908,381

(22) PCT Filed: Jul. 30, 2014

(86) PCT No.: PCT/IN2014/000501
§ 371 (c)(1),
(2) Date: Jan. 28, 2016

(87) PCT Pub. No.: WO2015/015513
PCT Pub. Date: Feb. 5, 2015

(65) Prior Publication Data
US 2016/0177043 A1    Jun. 23, 2016

(30) Foreign Application Priority Data

Jul. 31, 2013 (IN) .......................... 2294/DEL/2013

(51) Int. Cl.
| | |
|---|---|
| C08J 5/22 | (2006.01) |
| C02F 1/46 | (2006.01) |
| B01D 61/44 | (2006.01) |
| C02F 1/469 | (2006.01) |
| B01D 61/42 | (2006.01) |
| C02F 101/10 | (2006.01) |
| C02F 103/08 | (2006.01) |

(52) U.S. Cl.
CPC ............ *C08J 5/2256* (2013.01); *B01D 61/44* (2013.01); *C02F 1/4604* (2013.01); *C02F 1/4693* (2013.01); *C08J 5/2231* (2013.01); *B01D 61/422* (2013.01); *B01D 2325/16* (2013.01); *C02F 2101/10* (2013.01); *C02F 2103/08* (2013.01); *C08J 2333/20* (2013.01)

(58) Field of Classification Search
CPC .... C08J 5/2256; C08J 2333/20; C08J 5/2231; C02F 1/4604; C02F 1/4693; C02F 2101/10; B01D 61/44; B01D 61/422; B01D 2325/16
USPC ....................................................... 521/27
See application file for complete search history.

(56) References Cited

FOREIGN PATENT DOCUMENTS

WO    2013/005050 A1    1/2013

OTHER PUBLICATIONS

Mahendra Kumar et al: "Cross-Linked Poly(vinyl alcohol)-Poly(acrylonitrile-co-2-dimethylamino ethylmethacrylate) Based Anion Exchange Membranes in Aqueous Media", The Journal of Physical Chemistry B, vol. 114, No. 1, Jan. 14, 2010 (Jan. 14, 2010), pp. 198-206.*
Su et al: "Tunable water flux of a weak polyelectrolyte ultrafiltration membrane", Journal of Membrane Science 305 (2007), pp. 271-278.*
Sata et al. "Thermally responsive novel anion exchange membranes for electrodialysis", Chemical Communications (Cambridge) (1998), (12), 1303-1304.*
Mahendra Kumar, et al., "Cross-Linked Poly(vinyl alcohol)—Poly(acrylonitrile-co-2-dimethylamino ethylmethacrylate) Based Anion-Exchange Membranes in Aqueous Media," The Journal of Physical Chemistry B, vol. 114, No. 1, Jan. 14, 2010, pp. 198-206.
Uma Chatterjee, et al., "Amphiphilic poly(acrylonitrile)-co-poly(2-dimethylamino)ethyl methacrylate conetwork-based anion exchange membrane for water desalination," Journal of Materials Chemistry A, vol. 2, No. 22, Jan. 1, 2014, pp. 8396-8406.
Uma Chatterjee, et al., "Effect of phase separation and adsorbed water on power consumption and current efficiency of terpolymer conetwork-based anion exchange membrane," Journal of Materials Chemistry A, vol. 2, Jul. 30, 2014, pp. 16124-16134.
Hankun Xu, et al., "Novel anion exchange membrane based on copolymer of methyl methacrylate, vinylbenzyl chloride and ethyl acrylate for alkaline fuel cells," Journal of Membrane Science, vol. 354, No. 1-2, May 1, 2010, pp. 206-211.

(Continued)

*Primary Examiner* — Michael M Bernshteyn
(74) *Attorney, Agent, or Firm* — McDonald Hopkins LLC

(57) ABSTRACT

The present invention relates to the preparation of novel anion exchange membranes from bicomponent or tricomponent copolymers containing both quaternizable and cross-linkable moieties. The bicomponent copolymers consisted with polyacrylonitrile and poly(2-dimethylaminoethyl) methacrylate and the tricomponent copolymers consisted with polyacryloniterle and poly2-dimethylaminoethyl) methacrylate and polyn-butyl acrylate. Quaternization of dimethyl amino groups of copolymer by methyl iodide followed by cross-linking of acrylonitrile groups of copolymer by hydrazine hydrate resulted anion exchange membrane with desired properties such as high ion exchange capacity (1.30-1.50 meqg$^{-1}$), high transport number (0.92-0.93) for direct use in electrodyalysis unit. The tricomponent anion exchange membrane containing 32 wt % PDMA, 17 wt % PnBA, and 51 wt % PAN exhibited improved performance mainly in terms of low power consumption and high current efficiency during desalination of water.

6 Claims, 5 Drawing Sheets

(56) References Cited

OTHER PUBLICATIONS

Ludivine Franck-Lacaze, et al., "Protonation and diffusion phenomena in poly(4-vinylpyridine)-based weak anion-exchange membranes," Journal of Membrane Science, vol. 340, No. 1-2, Sep. 15, 2009, pp. 257-265.

Xu Tongwen, et al., "Fundamental studies of a new series of anion exchange membranes: membrane preparation and characterization," Journal of Membrane Science, vol. 190, No. 2, Sep. 15, 2001, pp. 159-166.

Toshikatsu Sata, et al., "Preparation and Properties of Anion Exchange Membranes Having Pyridinium or Pyridinium Derivatives as Anion Exchange Groups," Journal of Polymer Science Part A: Polymer Chemistry, vol. 36, No. 1, Jan. 15, 1998, pp. 49-58.

Dessouki, Ahmed M., et al., "Anionic membranes obtained by radiation grafting of 4-vinylpyridine onto poly(vinyl chloride)," Radiat. Phys. Chem., vol. 26, No. 2, 1985, pp. 157-163.

Herman, Henryk, et al., "The radiation-grafting of vinylbenzyl chloride onto poly(hexafluoropropylene-co-tetrafluoroethylene) films with subsequent conversion to alkaline anion-exchange membranes: optimisation of the experimental conditions and characterisation," Journal of Membrane Science, vol. 218, 2003, pp. 147-163.

Kaur, Inderjeet, et al., "Graft copolymerization of acrylonitrile and its binary mixture with 4-vinyl pyridine onto isotactic polypropylene powder by preirradiation method," Journal of Applied Polymer Science, vol. 56, 1995, pp. 1197-1205.

Kostov, G. K., et al., "Radiation-initiated graft copolymerization of 4-vinylpyridine onto polyethylene and polytetrafluoroethylene films and anion-exchange membranes therefrom," Journal of Applied Polymer Science, vol. 64, 1997, pp. 1469-1475.

\* cited by examiner

ANION EXCHANGE MEMBRANE FOR ELECTRODIALYSIS APPLICATIONS AND PROCESS FOR THE PREPARATION THEREOF

FIELD OF THE INVENTION

The present invention relates to anion exchange membrane (AEM) for water desalination by electrodialysis. Particularly, the invention relates to a process for the preparation of AEMs without using chloromethyl ether from copolymer of polyacrylonitrile (PAN) and poly(2-dimethyl amino)ethyl methacrylate (PDMA) optionally along with poly n-butylacrylate (PnBA).

BACKGROUND OF THE INVENTION

Strongly basic AEM is usually prepared by using copolymerization of styrene and divinyl benzene in presence of polyethylene (PE) for industrial uses. The preparation of AEM is a two-step process. First step is the chloromethylation of styrene part in the copolymer and second one is the quaternary amination of the $CH_2$—Cl part of styrene block in the copolymer film. The preparation of an AEM through this process is complicated and costly, because in the chloromethylation process, the common-used chloromethylether (CME) is carcinogenic and is potentially harmful to human health. An alternative way to prepare AEM is the graft copolymerization of vinyl monomers, such as 4-vinylpyridine, 2-vinylpyridine and vinylbenzylchloride onto various polymer films using various grafting technologies, such as UV-induced, plasma and irradiation methods. Several efforts have been made to avoid the use of CME for preparing AEM.

Reference may be made to U.S. Pat. No. 4,923,611 wherein it describes the preparation of anion-exchange membrane from resin containing a high molecular weight compound having haloalkyl groups by treatment with ultraviolet radiation or ionizing radiation.

Reference may be made to U.S. Pat. No. 4,253,900 wherein it discloses the preparation of bipolar ion exchange membranes from polystyrene-divinylbenzene-polyolefin composition wherein the polystyrene content of the component strongly acidic cationic membrane.

Reference may be made to US20090281245A1 wherein it discloses the preparation of proton exchange fuel cell membranes from graft or block copolymers containing sulfonated side groups.

Reference may be made to U.S. Pat. No. 4,329,434A wherein it describes the preparation of fluorinated cation exchange membrane containing carboxylic acid groups and sulfonic acid groups, both in the form of a specific pendant structure.

Reference may be made to the article "The radiation-grafting of vinylbenzyl chloride onto poly(hexafluoropropylene-co-tetrafluoroethylene) films with subsequent conversion to alkaline anion exchange membranes: optimization of the experimental conditions and characterization" published in J. Membr. Sci. 218, 147, (2003) by Herman et al. This paper reported the preparation of AEM by grafting of vinylbenzylchloride on copolymer matrix followed by amination.

Reference may be made to the article "Radiation-initiated graft copolymerization of 4-vinylpyridine onto polyethylene and polytetrafluoroethylene films and anion exchange membranes there from" published in J. Appl. Polym. Sci. 1469, 64, (1997) by Kostov et al. The article describes the preparation of AEM by radiation-initiated graft copolymerization of 4-vinylpyridine onto low-density polyethylene and polytetrafluoroethylene films by γ-rays from $^{60}Co$ source in nitrogen atmosphere followed by quaternization.

Reference may be made to another article "Graft copolymerization of acrylonitrile and its binary mixture with 4-vinylpyridine onto isotactic polypropylene powder by pre irradiation method" published in J. Appl. Polym. Sci. 1197, 56 (1995) by Kaur et al. The article describes the graft copolymerization of acrylonitrile and its binary mixture with 4-vinyl pyridine onto isotactic polypropylene powder in aqueous medium, using γ-rays as an initiator.

Reference may be made to another article "Anionic membranes obtained by radiation grafting of 4-vinylpyridine onto poly(vinyl chloride)" published in Radiat. Phys. Chem. 157, 26, (1985) by Dessouki el al. The paper reported the preparation of AEM by radiation grafting of 4-vinylpyridine onto polyvinylchloride followed by quaternization with methyl iodide.

Reference may be made to another article "Preparation and properties of anion exchange membranes having pyridinium or pyridinium derivatives as anion exchange groups" published in J. Polym. Sci. A 49, 36 (1998) by sata et al. The paper reported the preparation of AEM with pyridinium groups from a copolymer membrane composed of chloromethylstyrene and divinylbenzene, and pyridine and pyridine derivatives.

Reference may be made to another article "Fundamental studies of a new series of anion exchange membranes: membrane preparation and characterization" published in J. Memb. Sci. 159, 199, (2001) by Xu et al. This article reported the preparation of a new class of cross-linked AEM from linear engineering plastics poly(2,6-dimethyl-1,4-phenylene oxide) by conducting the processes of bromination and amination at both benzyl and aryl positions. This article described the preparation of AEM without the use of carcinogenic CME. The prepared AEMs were characterized in terms of ion exchange capacity, water content, membrane potential and transport number of membrane. The results show that the membrane properties are significantly affected by the bromination processes: benzyl-substitution will enhance the ion exchange capacity and water content, while the aryl-substitution will decrease the water content with approximately unchanged ion exchange capacity.

Reference may be made to another article "Cross-Linked Poly(vinyl alcohol)-Poly(acrylonitrile-co-2-dimethylamino ethylmethacrylate) Based Anion-Exchange Membranes in Aqueous Media" published in J. Phy. Chem. B 198, 114, (2010) by Mahendra Kumar et al. This paper reported the preparation of AEM based on poly(vinyl alcohol) and copolymers of PAN and PDMA in aqueous medium. AEM prepared through this technique avoids the use of CME.

Reference may be made to another article "Novel anion exchange membrane based on copolymer of methyl methacrylate, vinylbenzyl chloride and ethyl acrylate for alkaline fuel cells" published in J. Memb. Sci. 206, 354, (2010) by Xu et al. This paper reported the preparation of AEM based on the copolymer of methyl methacrylate, vinylbenzyl chloride and ethyl acrylate for the potential applications for direct methanol alkaline fuel cell.

Reference may be made to another article "Protonation and diffusion phenomena in poly(4-vinyl pyridine) based weak anion exchange membrane" published in J. Memb. Sci. 257, 340, (2009) by Lacaze et al. This paper reported the preparation of AEM by radiochemical grafting of poly(4-vinylpyridine) chains on polymeric matrices. The AEM prepared by this process also avoid the use of CME.

OBJECTS OF THE INVENTION

The main object of the present invention is to prepare an anion exchange membrane (AEM) for water desalination from copolymer containing both quaternizable and cross-linking moieties for brackish water desalination by electrodialysis.

Another object of the present invention is to provide a process for producing an AEM, comprising of mixing from 18 to 30 wt % of a polymer having anion exchange groups or active groups convertible to anion exchange groups, and from 82 to 70 mass % of a polymer having no anion exchange groups or no active groups convertible to anion exchange groups but contains functional group which can be cross-linked.

Another object of the present invention is to prepare positively charged AEM without the use of chloromethyl ether (CME).

Yet another object of the present invention is to demonstrate that prepared AEM exhibit similar performance to that of conventional styrene-divinyl benzene (DVB)-based membranes prepared using CME.

Yet another object of the present invention is to demonstrate such equivalence of performance through electrodialysis-based desalination, keeping the cation exchange membrane (styrene-DVB based) constant.

SUMMARY OF THE INVENTION

Accordingly, present invention provides anion exchange membranes (AEM) comprising quaternized, cross linked copolymers, wherein said copolymers are poly(2-dimethylaminoethyl)methacrylate (PDMA) in the range of 7 to 42 wt % and polyacrylonitrile (PAN) in the range of 30 to 93 wt %, optionally along with 17 to 50 wt % poly-n-butyl acrylate (PnBA).

In another embodiment of the invention, the copolymers are selected from bicomponent and tricomponent copolymers.

In an another embodiment of the invention, the bicomponent copolymer is a copolymer of polyacrylonitrile (PAN) and poly(2-dimethylaminoethyl)methacrylate (PDMA) (PAN-co-PDMA), wherein said polyacrylonitrile having monomer acrylonitrile in the range of 72-70 wt % and poly(2-dimethylaminoethyl)methacrylate having monomer dimethylaminoethyl methacrylate in the range of 28-30 wt %.

In yet another embodiment of the invention, the tricomponent copolymer is a copolymer of polyacrylonitrile (PAN), poly(2-dimethylaminoethyl)methacrylate (PDMA) and poly-n-butylacrylate (PnBA) (PAN-co-PDMA-co-PnBA) wherein said polyacrylonitrile having monomer acrylonitrile in the range of 49-55 wt %, poly(2-dimethylaminoethyl)methacrylate having monomer dimethylaminoethyl methacrylate in the range of 28-33 wt % and poly-n-butylacrylate having monomer n-butyl acrylate in the range of 17-18 wt %.

In an embodiment, present invention provides a process for the preparation of anion exchange membranes (AEM), comprising the steps of:
  i. providing a copolymer synthesized by free radical polymerization;
  ii. treating the copolymers as provided in step (i) with an alkyl halide in the ratio ranging between 1 to 1.5 wt % in presence of DMF, followed by stirring at a temperature in the range of 30 to 50° C. for a period in the range of 12 to 24 hr to obtain quaternized copolymer;
  iii. treating the quaternized copolymer as obtained in step (ii) with diamine in presence of DMF at a temperature in the range of 70 to 80° C. for a period in the range of 40 to 50 minute, followed by drying at a temperature in the range of 70 to 80° C. for a period in the range of 3-4 h to obtain an anion exchange membrane.

In yet another embodiment of the present invention, copolymer is selected from polyacrylonitrile (PAN)-co-poly (2-dimethylaminoethyl)methacrylate (PDMA) (PAN-co-PDMA) or polyacrylonitrile (PAN)-co-poly(2-dimethylaminoethyl)methacrylate (PDMA)-co-poly-n-butylacrylate (PnBA) (PAN-co-PDMA-co-PNBA).

In yet another embodiment of the present invention, copolymer (PAN-co-PDMA) is prepared by free radical copolymerization of mixture of acrylonitrile in the range of 72-70 wt % and dimethylaminoethyl methacrylate in the range of 28-30 wt % monomers.

In yet another embodiment of the present invention, copolymer (PAN-co-PDMA-co-PNBA) is prepared by free radical copolymerization of mixture of acrylonitrile in the range of 49-55 wt %, dimethylaminoethyl methacrylate in the range of 28-33 wt % and n-butyl acrylate in the range of 17-18 wt % monomers.

In yet another embodiment of the present invention, the alkyl halide is selected from methyl iodide and methyl bromide.

In yet another embodiment of the present invention, the alkyl halide concentration is 4 to 10 mol % of poly(2-dimethylaminoethyl) methacrylate unit present in the respective copolymers for quaternization reaction.

In yet another embodiment of the present invention, the diamine is selected from hydrazine hydrate, ethylenediamine individually or in combination thereof.

In yet another embodiment of the present invention, the diamine concentration is in the range of 15 to 40 wt % of PAN unit present in the copolymer for the cross-linking reaction.

In yet another embodiment of the present invention, current efficiency of the membrane is in the range of 63 to 92%.

In yet another embodiment of the present invention, power consumption of the membrane is in the range of 0.73 to 1.35 KWh/Kg at 1.5-2.0 volts/cell pair during desalination of water of TDS (Total Dissolved Solid) 5000 ppm.

DETAIL DESCRIPTION OF THE INVENTION

Figure 1:
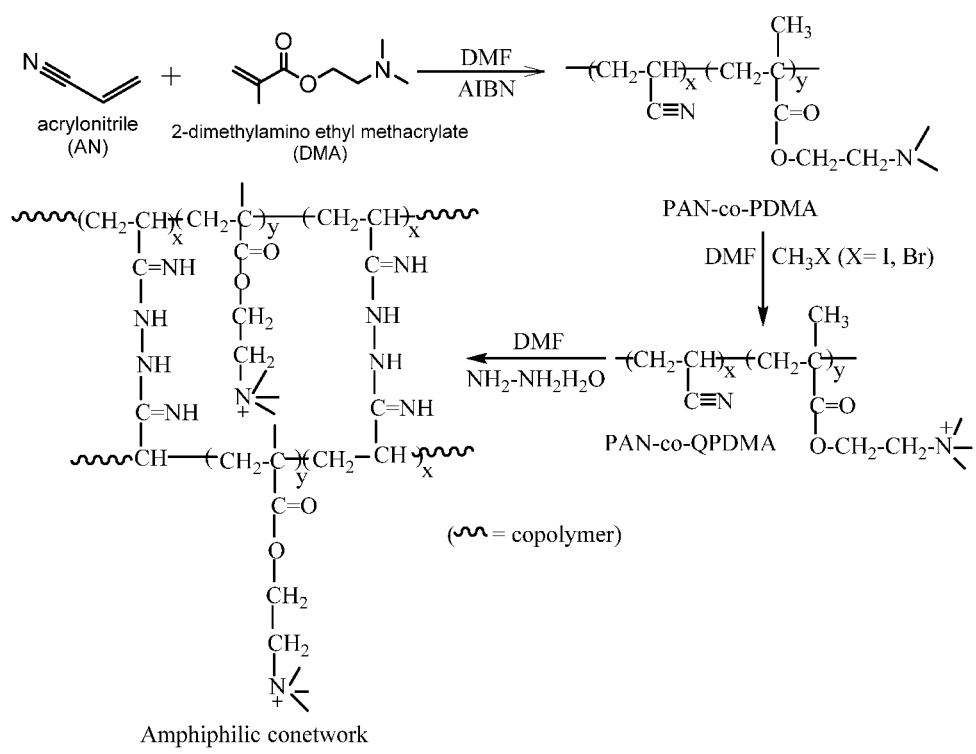
FIG. 1 represents preparation strategy of AEM from bicomponent PAN-co-PDMA copolymer.

The present invention provides an anion exchange membranes for water desalination/purification from copolymers of polyacrylonitrile (PAN) and poly2-dimethylaminoethyl methacrylate (PDMA) (PAN-co-PDMA) or copolymers of PAN, PDMA and poly-n-butylacrylate (PnBA) (PAN-co-PDMA-co-PNBA) obtained by free radical copolymerization of mixture of acrylonitrile (AN) and 2-dimethyl aminoethyl methacrylate (DMA) and mixture of AN, DMA and n-butyl acrylate (BA) in DMF solvent using radical initiator such as azo bis isobutyronitrile (AIBN). Quaternization and cross-linking of these copolymers by methyl iodide and hydrazine hydrate yielded AEM for direct use in electrodialysis unit. Treatment of quaternized copolymers with hydrazine hydrate produced thin films which exhibited desalination of water by electrodialysis. In this way, new AEM has been prepared by avoiding the use of CME. The prepared AEMs having ion exchange capacity of up to 1.5 meq/g and resistance 5-7 Ohms. The AEMs prepared from PAN-co-PDMA copolymer exhibited 74-80% current efficiency and 0.94-1.15 KWh/Kg power consumption whereas the PAN-co-PDMA-co-PnBA copolymer exhibited 0.66-0.95 KWh/Kg power consumption and 94-96% power efficiency during desalination of water of containing 2000 ppm NaCl in domestic electrodialysis unit of area 13 cm×5 cm. The process involved
 i. synthesis of these copolymers;
 ii. quaternization of DMA groups by methyl iodide and;
 iii. crosslinking of the quaternized copolymers by treatment with hydrazine hydrate.

Scheme 1 shows the synthetic strategy of preparation of AEMs from bicomponent copolymer and Scheme 2 shows the synthetic strategy of preparation of AEMs from terpolymer. The developed membranes exhibit brackish water desalination from 5000 ppm to 500 ppm by electrodialysis (ED). The power consumption during ED process is very less and efficiency of the process is very high.

The main advantages are the following:
 1. Preparation of cross-linked network films from copolymers synthesized by free radical copolymerization and use of these cross-linked films as AEM.
 2. Use of bicomponent copolymers containing both quaternizable dimethyl aminothyl methacrylate (DMA) and cross-linkable moieties acrylonitrile (AN) for the preparation of AEM.
 3. Use of tricomponent copolymers containing additionally PnBA (18 wt %) as a third component for the preparation of AEMs with enhanced performance in terms of low power consumption and higher current efficiency.
 4. Demonstration of novel effect of PnBA on membrane performance. The water uptake of the AEM is reduced and therefore back diffusion of water is hindered and therefore the desalination process becomes much more faster. As a result, the power consumption of the process is less and current efficiency of the process is high.
 5. Avoiding the use of carcinogenic CME for the preparation of AEM.

EXAMPLES

The following examples are given by way of illustration and therefore should not be construed to limit the scope of the present invention.

Example 1

Preparation of Bicomponent Copolymers (PAN-co-PDMA-1)

A mixture containing acrylonitrile (AN) (120 ml, 1.83 mol), (2-dimethylamino) ethyl methacrylate (DMA) (30 ml, 0.178 mol), and 150 ml of dimethyl formamide (DMF) were taken in a 1 round bottom flask fitted with a condenser. Azobisisobutyronitrile (AIBN 1.5 gm 9.14×10$^{-3}$ mol) was used as an initiator (1% (w/w) with respect to monomer mixture). The reaction mixture was purged with $N_2$ for 15 minutes before placing the flask into oil bath. The polymerization was carried out at 70° C. under constant stirring. The AIBN was added in two installments i.e. 0.75 gm was added before starting the polymerization and the remaining 0.75 gm was added after 5 hrs of polymerization. The reaction was continued for 10 hrs. The copolymer was then precipitated in methanol and dried under vacuum at 80° C. for 48 h. The monomer conversion was found to be 80% by gravimetrically. The final composition of all the copolymer was obtained by $^1$H NMR (Table 1).

Example 2

Preparation of PAN-co-PDMA-2

This example pertains to the preparation of PAN-co-PDMA-2 by varying composition of feed monomers. The polymer was prepared according to example 1, except the ratio of AN and DMA was different. The quantity of monomer solvent and initiator was as follows: AN (90 ml, 1.37 mol), DMA (10 ml, 0.059 mol), DMF (100 ml), AIBN=1 gm was used. The final composition of the copolymer was obtained by $^1$H NMR (Table 1)

Example 3

Preparation of PAN-co-PDMA-3

This example pertains to the preparation of PAN-co-PDMA-3 by varying composition. The polymer was prepared according to example 1, except the ratio of AN and DMA was different. The quantity of monomer solvent and initiator was as follows: AN (75 ml, 1.14 mol), DMA (25 ml, 0.148 mol), DMF (100 ml), AIBN=1 gm was used. The final composition of the copolymer was obtained by $^1$H NMR (Table 1).

Example 4

Preparation of PAN-co-PDMA-4

This example pertains to the preparation of PAN-co-PDMA-4 by varying composition. The polymer was prepared according to example 1, except the ratio of AN and DMA was different. The quantity of monomer solvent and initiator was as follows: AN (70 ml, 1.06 mol), DMA (30 ml, 0.178 mol), DMF (100 ml), AIBN=1 gm was used. The final composition of the copolymer was obtained by $^1$H NMR (Table 1).

TABLE 1

Compositions of the prepared copolymers of examples 1-4.

| Copolymer | PAN/PDMA (% mol/mol) | PAN/PDMA (% wt/wt) |
| --- | --- | --- |
| PAN-co-PDMA-1 | 88/12 | 72/28 |
| PAN-co-PDMA-2 | 94/6 | 85/15 |
| PAN-co-PDMA-3 | 85/15 | 66/34 |
| PAN-co-PDMA-4 | 80/20 | 58/42 |

Example 5

Quaternization of PAN-co-PDMA-1

This example pertains to experiments on quaternization on —N(CH$_3$)$_2$ position of the copolymer of Example 1. DMF (150 mL) was added into the polymer solution of Example 1. Iodomethane (CH$_3$I) 100 ml (1.60 mol) was next added into the flask slowly. The resulting solution was stirred at ambient temperature for 24 hrs. After quaternization, the resultant polymer was precipitated in 1 MeOH dried in oven at 45° C.

Example 6

Quaternization of PAN-co-PDMA-2

This example pertains to experiments on quaternization on —N(CH$_3$)$_2$ position of the copolymer of Example 2. Same procedure was followed as example 5.

Example 7

Quaternization of PAN-co-PDMA-3

This example pertains to experiments on quaternization on —N(CH$_3$)$_2$ position of the copolymer of Example 3. Same procedure was followed as example 5.

Example 8

Quaternization of PAN-co-PDMA-3

This example pertains to experiments on quaternization on —N(CH$_3$)$_2$ position of the copolymer of Example 4. Same procedure was followed as example 5.

Example 9

Preparation of AEM-1

This example pertains to preparation of AEM of quaternized copolymer of example 5. 40 gm of quaternized copolymer was dissolved in 120 ml of DMF and then 13 ml of hydrazine hydrate was added slowly into the mixture under stirring. The mixture was then placed in an oil bath at 75° C. for 45 minutes. Then the mixture was cooled and purged with N$_2$ followed by putting under vacuum pump under stirring to remove all the bubbles produced during reaction. The polymer solution was then caste on a thin glass plate by help of doctor's blade and the plate was kept at 50° C. for 3 hrs for complete drying of the membrane.

Example 10

Preparation of AEM-2

This example pertains to preparation of AEM of quaternized copolymer of Example-6. Similar procedure was followed as the example 9.

Example 11

Preparation of AEM-3

This example pertains to preparation of AEM of quaternized copolymer of Example-7. Similar procedure was followed as the example 9.

Example 12

Preparation of AEM-4

This example pertains to preparation of AEM of quaternized copolymer of Example-8. Similar procedure was followed as the example 9. Table 1 summarizes compositions of copolymers which are the precursors of AEM-1, AEM-2, AEM-3 and AEM-4.

Preparation of Tricomponent Copolymers

Example 13

Preparation of PAN-co-PnBA-co-PDMA-1

PAN-co-PnBA-co-PDMA terpolymer containing different amount of PnBA and PAN were synthesized by free radical copolymerization of mixture of AN+BA+DMA monomers. A typical copolymerization process is as follows. AN (65 mL, 0.99 mol), nBA (15 mL, 0.105 mol), DMA (20 mL, 0.118 mol), and DMF (100 mL) were taken in a round bottom flask (1 L) fitted with a condenser. AIBN (1.0 g 6.09×10$^{-3}$ mol) was then added to the admixture. The reaction mixture was purged with N$_2$ for 15 min before placing the flask into oil bath. The polymerization was carried out at 90° C. under constant stirring under N$_2$ atmosphere. The reaction was continued for 10 h. The polymer was precipitated in excess methanol, thoroughly washed with methanol and dried under vacuum at 80° C. for 48 h. The copolymer was characterized by NMR, ATR IR spectroscopy and DSC analyses. The composition of the prepared copolymer which is the precursor of AEM-5 was determined from NMR spectroscopy (Table 2).

Example 14

Preparation of PAN-co-PnBA-co-PDMA-2

This example pertains the preparation of terpolymer PAN-co-PnBA-co-PDMA-2. Similar procedure was followed as example 13 except the quantity of monomer. The quantity of AN (70 mL, 1.07 mol), nBA (15 mL, 0.105 mol), DMA (15 mL, 0.089 mol) were used. The composition of the prepared copolymer which is the precursor of AEM-6 was determined from NMR spectroscopy (Table 2).

Example 15

Preparation of PAN-co-PnBA-co-PDMA-3

This example pertains the preparation of terpolymer PAN-co-PnBA-co-PDMA-3. Similar procedure was followed as example 13 except the quantity of monomers. The quantity of AN (55 mL, 0.84 mol), nBA (25 mL, 0.175 mol), DMA (20 mL, 0.118 mol) were used. The composition of the prepared copolymer which is the precursor of AEM-7 was determined from NMR spectroscopy (Table 2).

Example 16

Preparation of PAN-co-PnBA-co-PDMA-4

This example pertains the preparation of terpolymer PAN-co-PnBA-co-PDMA-4. Similar procedure was followed as example 13 except the quantity of monomers. The quantity of AN (45 mL, 0.687 mol), nBA (35 mL, 0.245 mol), DMA (20 mL, 0.118 mol) were used. The composition of the prepared copolymer which is the precursor of AEM-8 was determined from NMR spectroscopy (Table 2).

Table 2 Summarizes the composition of AEM-5 to AEM-8 anion exchange membranes prepared by examples 17-20.

| Copolymer | PAN/PnBA/PDMA (% wt/wt) | PAN/PnBA/PDMA (% mol/mol) |
|---|---|---|
| PAN-co-PnBA-co-PDMA-5 | 50:18:32 | 74:11:15 |
| PAN-co-PnBA-co-PDMA-6 | 57:17:26 | 78:10:12 |
| PAN-co-PnBA-co-PDMA-7 | 33:42:25 | 56:30:14 |
| PAN-co-PnBA-co-PDMA-8 | 30:50:20 | 52:36:12 |

Example 17

Quaternization of PAN-co-PnBA-co-PDMA-1

This example pertains to experiments on quaternization on —N(CH$_3$)$_2$ position of the copolymer of Example 13. 150 ml DMF was added into the polymer solution of Example 13. Iodomethane (CH$_3$I) 100 ml (1.60 mol) was next added into the flask slowly. The resulting solution was stirred at ambient temperature for 24 hrs. After quaternization, the resultant polymer was precipitated in 1 lt MeOH dried in oven at 45° C.

Example 18

Quaternization of PAN-co-PnBA-co-PDMA-2

This example pertains to experiments on quaternization on 13 N(CH$_3$)$_2$ position of the copolymer of Example 14. Similar procedure was followed as the example 17.

Example 19

Quaternization of PAN-co-PnBA-co-PDMA-3

This example pertains to experiments on quaternization on —N(CH$_3$)$_2$ methyl position of the copolymer of Example 15. Similar procedure was followed as the example 17.

Example 20

Quaternization of PAN-co-PnBA-co-PDMA-4

This example pertains to experiments on quaternization on —N(CH$_3$)$_2$ methyl position of the copolymer of Example 16. Similar procedure was followed as the example 17.

Example 21

Preparation of AEM-5

This example pertains to preparation of AEM-4 of quaternized copolymer of Example 17. 40 gm of copolymer was dissolved in 120 ml of DMF and then 13 ml of hydrazine hydrate was added slowly into the mixture under stirring. The mixture was then placed in an oil bath at 75° C. for 45 minutes. Then the mixture was cooled and purged with N$_2$ followed by putting under vacuum pump under stirring to remove all the bubbles produced during reaction. The polymer solution was then caste on a thin glass plate and the plate was kept at 50° C. for 3 hrs for complete drying of the membrane. The membrane was peeled off and washed with water to remove the trapped DMF inside the membrane.

Example 22

Preparation of AEM-6

This example pertains to preparation of AEM-6 of quaternized copolymer of Example 18. Similar procedure was followed as the preparation of AEM-5.

Example 23

Preparation of AEM-7

This example pertains to preparation of AEM-5 of quaternized copolymer of Example 19. Similar procedure was followed as the preparation of AEM-5.

Example 24

Preparation of AEM-8

This example pertains to preparation of AEM-8 of quaternized copolymer of Example 20. Similar procedure was followed as the preparation of AEM-5.

Example 25

Determination of Ionic Resistance ($R^m$), Conductivity ($K^m$) Ion Exchange Capacity and Transport Number ($t^-$) of the AEMs The $R^m$ and $K^m$ of the membranes were determined in a manually set up clip-on cell, composed of two black graphite electrodes fixed on acrylic plates. The active area of electrodes as well as of the membrane was 1.0 cm$^2$. Before determination of $R^m$ and $K^m$, membranes were equilibrated with NaCl solutions (400 to 4000 mg/L) for 24 h. During the experiments, the wet membrane was tightly sandwiched between the electrodes and secured in place by means of set of screws. The $R^m$ was measured by digital conductivity meter (Model CC 601, Century, India) at ambient temperature. The thickness of the membrane was measured by a digital caliber, and the $K^m$ was estimated from the following equation:

$$K^m = \Delta x / A R^m \quad (1)$$

where $\Delta x$ is the thickness of the wet membrane, A is the effective membrane area.

The IEC, defined as the ratio between number of exchangeable ionic groups (equivalents) and the weight of dry membrane, was determined by the classical titration method. Pieces of membrane samples with known dry weight were thoroughly washed with double distilled water and equilibrated in 50 mL of 0.10 M KNO$_3$ solution for 24 h. Equilibrated solution was titrated against 0.10 M silver nitrate solution using di-iododimethyl fluorescein solution in ethanol as indicator. The end point was detected by visualizing the color change from orange to blue. At least three cycles of ion exchanging and regeneration was used to obtain steady value. Averages of 4-5 were reported here.

When an ion exchange membrane is in contact with electrolyte solutions of different concentrations, an electrical potential, also known as membrane potential ($E_m$) develops across the membrane. The magnitude of this potential depends on the intrinsic membrane property as well as the concentrations of electrolyte solutions. The $t^-$ is defined as the amount of charge transported through an IEM by that specific ion. $E_m$ was measured in a two compartment cell, in which a vertical AEM of 9.0 cm$^2$ effective area was separated by electrolyte solutions (NaCl) of concentration 0.1 M and 0.01 M respectively. The potential difference across the membrane was measured using a multimeter (MECO, 81K-TRMS) which was connected to calomel reference electrodes. The $t^-$ was calculated from the following equation:

$$E_m = \frac{RT(2t^- - 1)}{F} \ln \frac{C_1}{C_2} \quad (2)$$

where R is the gas constant, F is the Faraday constant, T is the absolute temperature (298° K.), $C_1$ and $C_2$ are the concentration of electrolyte solutions in the testing cell. The values of $K^m$, IEC and $t^-$ of the AEMs prepared by examples 9-12 and 21-24 are presented in Table 3.

TABLE 3

Electrochemical properties of the AEMs prepared by examples 9-12 and 21-24.

| Abbreviation | IEC (meqg$^{-1}$) | $K^m$ (0.1M NaCl) | $t^-$ |
|---|---|---|---|
| AEM-1 | 1.30 | 2.22 | 0.92 |
| AEM-2 | 0.95 | 1.19 | 0.81 |
| AEM-3 | 1.38 | 2.6 | 0.93 |
| AEM-4 | 1.45 | 3.26 | 0.94 |
| AEM-5 | 1.25 | 3.02 | 0.86 |
| AEM-6 | 1.50 | 4.57 | 0.93 |
| AEM-7 | 1.26 | 3.50 | 0.83 |
| AEM-8 | 1.20 | 2.44 | 0.75 |

Example 26

Determination of Power Consumption (W) and Current Efficiency (CE %) during Water Desalination via Electrodialysis The water desalination efficiency of the prepared AEM was determined by ED using an in-house prepared ED cell. A laboratory-scale ED unit containing five cells of standardized CEM and five cells of novel AEMs each having an effective cross-section area of 13×5=65 cm² were used. Scheme 3 shows the ED setup and the membrane configuration in the cell. The standard CEM was prepared by sulfonation of inter-polymer of PE and styrene-co-DVB polymer. The electrode housings were prepared by using rigid polyvinyl chloride sheets with built-in flow distributors and outlets. The cathode and anode used were stainless steel 316 sheets and platinum-coated titanium tantalum respectively. A parallel-cum series flow arrangement in three stages was used in the ED unit. Peristaltic pumps were used to recirculate the outlet streams to the inlet of the respective stream. There were three outlet streams in recirculation mode of operation (diluted, concentrated and electrodes wash). Both electrode chambers were interconnected and flushed with a dilute $Na_2SO_4$ solution. The known volume of water with known salt concentration (TDS=5000 ppm and 2000 ppm) was re-circulated in both, diluted and concentrated stream for all the experiments. A predetermined DC electrical potential was applied between the electrodes by means of an AC-DC rectifier. Recirculation of both diluted and concentrated compartment streams was continued throughout the experiments. The whole setup was placed at ambient condition (303K) without any additional temperature control. Samples were withdrawn at different time intervals and final concentration was measured. The flow rate was 5.4 L/h. Power consumption (W) is the amount of energy needed to transport one Kg of NaCl. W (KWh/Kg) for NaCl removal can be obtained by the following equation:

$$W = \int_Q^v VIdt/w \quad (3)$$

where V is the applied voltage; I is the current (amp); dt is the time (h) allowed for the desalination process; and w is the weight of salt (Kg) removed.

The current efficiency (CE %), is the fraction of the current transported by the target ions and is obtained by the following equation:

$$CE(\%) = \frac{w \times F}{M \times N \times Q} \times 100 \quad (4)$$

where F is the Faraday constant (26.8 amp·h); w is amount of salt removed (g), M is the molecular weight of NaCl (58.5 g/mol), N is the number of cell pairs used in the ED unit (5 pairs), Q is the amount of electricity passed throughout the system (amp·h).

Example 27

Determination of Limiting Current Density of the Prepared AEMs using Water TDS 2000 ppm The limiting current density of the prepared membrane (AEM-1, AEM-5, AEM-6 and AEM-7 of Example 9, 21, 22 and 23 was determined using water TDS 2000 ppm using 5 cell pairs of different AEMs under single pass and by varying the voltage from 1-6 Volt/cell pair. The current density (Amp cm²) vs. Voltage applied plot has been calculated and shown in FIG. 1. From FIG. 1 it can be concluded that above 4.5 volt/cell pair water splitting will start.

Example 28

Desalination of Water (TDS=5000 ppm) at an Applied Potential 1-2 Volt/cell Pair using AEMs The desalting experiments with feed water TDS 5000 ppm using AEM-1, AEM-5, AEM-6, AEM-7 of Examples 9, 21, 22, 23 and commercial membrane IONSEP-HC-A, and PE/Pst-co-PDVB based interpolymer AEM (IPA) prepared using CME were carried out in recirculation mode using applied potential 1.5 and 2 Volt/cell pair. The final TDS was 500 ppm. The results for the desalination process in terms of power consumption and current efficiency are shown in Table 4.

TABLE 4

ED unit desalination results using water TDS (5000 ppm) by different AEMs

| | W (KW · h/Kg) | | CE (%) | |
|---|---|---|---|---|
| Type of membrane | 1.5 V/cell pair | 2 V/cell pair | 1.5 V/cell pair | 2 V/cell pair |
| AEM-6 | 1.13 | 1.26 | 70 | 77 |
| AEM-5 | 0.66 | 0.95 | 94 | 96 |
| AEM-7 | 1.15 | 1.27 | 67 | 75 |
| AEM-1 | 0.94 | 1.15 | 74 | 80 |
| IONSEP-HC-A (commercial) | 0.885 | 1.02 | 78 | 85 |
| IPA | 0.723 | 0.985 | 95.7 | 97 |

Example 29

Desalination of Water (TDS=2000 ppm) at Applied Potential 1-2 Volt/cell Pair using AEMs The desalting experiments using AEM-1, AEM-5, AEM-6, AEM-7 of Examples 9, 21, 22, 23 and commercial membrane IONSEP-HC-A and PE/Pst-co-PDVB based interpolymer anion exchange membrane (IPA) prepared using CME were repeated in recirculation mode using applied potential 1.5 and 2 Volt/cell pair. The feed and final TDS were 2000 and 500 ppm. The results for the desalination process in terms of power consumption and current efficiency are shown in Table 5.

TABLE 5

ED unit desalination results using different AEMs

| Type of membrane | W (KW · h/Kg) | | CE (%) | |
| --- | --- | --- | --- | --- |
| | 1.5 V/cell pair | 2 V/cell pair | 1.5 V/cell pair | 2 V/cell pair |
| AEM-6 | 1.25 | 1.34 | 65 | 71 |
| AEM-5 | 0.73 | 0.99 | 88 | 92 |
| AEM-7 | 1.28 | 1.39 | 63 | 69 |
| AEM-1 | 1.07 | 1.35 | 65 | 68 |
| IONSEP-HC-A (commercial) | 1.02 | 1.28 | 69 | 88 |
| IPA | 0.833 | 1.02 | 83 | 88 |

Example 30

Figure 2:
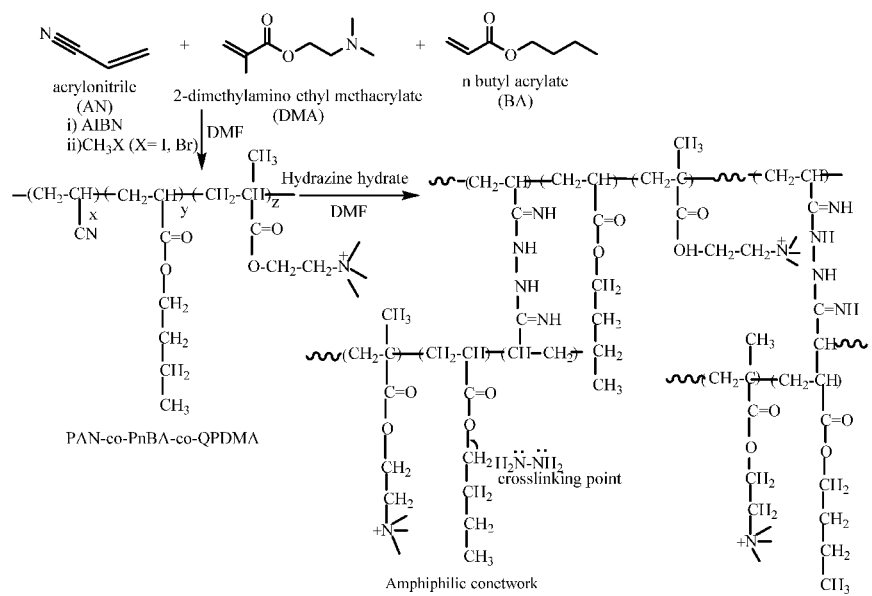
FIG. 2. represents preparation strategy of AEM from tricomponent PAN-co-PnBA-co-PDMA copolymer.

Comparison of Performance Evaluation of Prepared AEMs during ED using Water of TDS 2000 ppm at Different pH The desalination capacity of the prepared AEM-1 of Example 7 was determined using diluted sea water of 2000 ppm TDS using 5 cell pairs under recirculation mode at an applied potential 2 Volt/cell pair under different pH (5, 8 & 10). It can be said from the Current vs Time plot (FIG. 2) that the rate of desalination is faster at lower pH (at pH 5) and desalination rate at pH 8 and at 10 are similar. It means that the membranes are stable from pH 5 to 10.

Example 31

Determination of the Thermal Stability of Prepared AEMs

Figure 3:
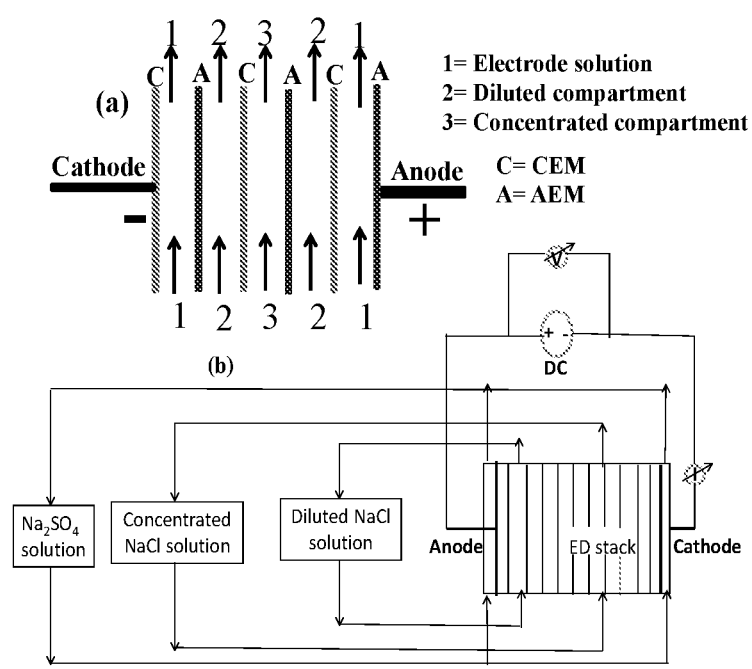
FIG. 3 represents schematic representation of electrodialysis (ED) cell configuration (a) and diagram of the ED test unit used (b).

The thermal stability of the prepared AEM-1 and AEM-4 of Example 9 and 20 was determined by taking measured dimension of AEMs and placed in water of TDS 2000 ppm and kept them at 70° C. for up to 6 hrs. After certain time interval, conductivity of the AEMs was measured. From the Conductivity vs exposure time plot (FIG. 3) it is observed that the conductivity remains constant even after exposure at 70° C. for 6 h. Therefore, it can be concluded that the membranes are stable at higher temperature.

Example 32

Determination of the Stability of Prepared AEMs at Different pH

Figure 4:
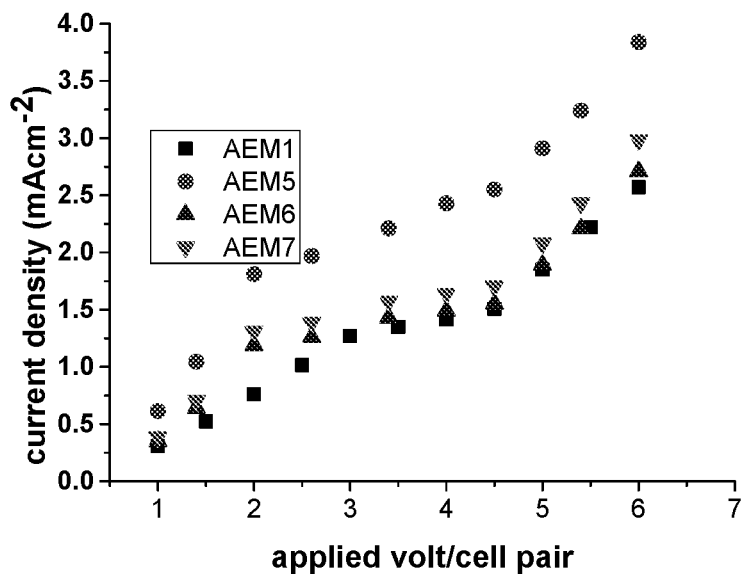
FIG. 4 represents current density vs volt/cell pair plots of different AEMs using water TDS 2000 ppm.
Figure 5:
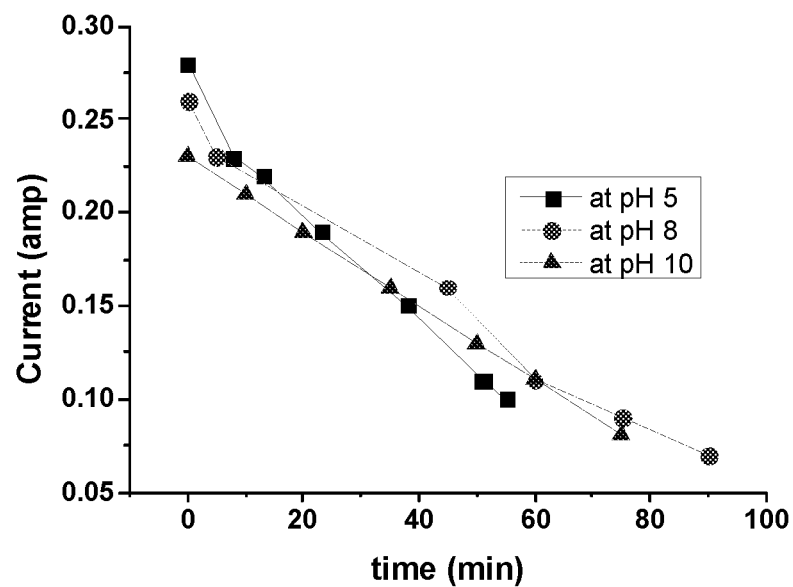
FIG. 5 represents current vs time plot during water desalination of TDS 2000 ppm using AEM-1 at three different pH.
Figure 6:
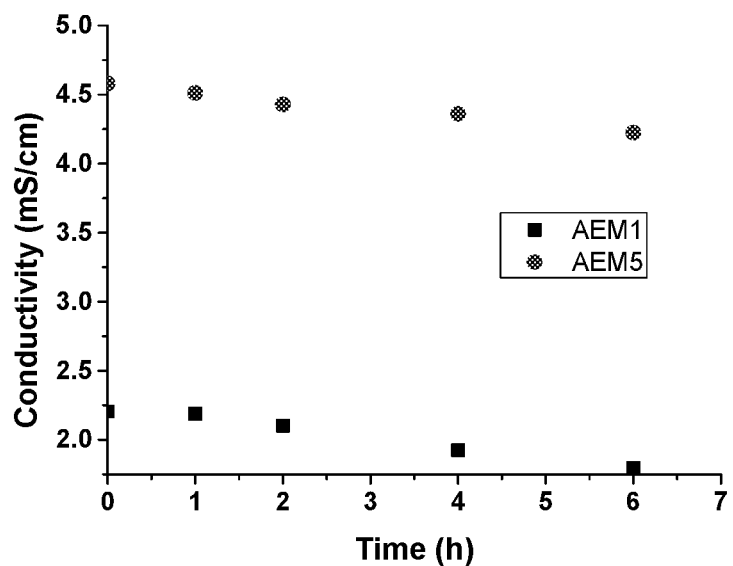
FIG. 6 represents conductivity vs time plots of AEM-1 and AEM-5 after immersing the membranes in water of TDS 2000 ppm at 70° C. for 6 h.
Figure 7:
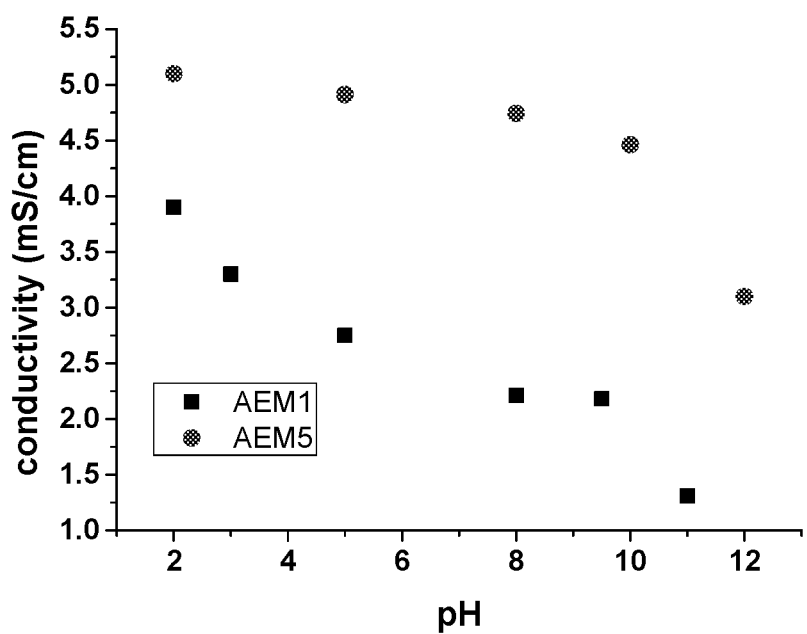
FIG. 7 represents conductivity vs pH of AEM-1 and AEM-5 after immersing the membranes in water of TDS 2000 ppm at different pH for 12 h.

Six different pieces of the AEM-1 and AEM-5 prepared using Example 9 and Example 20 were placed in diluted sea water of 2000 ppm TDS having different pH (pH 2 to 11). The membrane conductivity was measured and plotted against pH (FIG. 4). From the conductivity vs pH plot, it is observed that membrane conductivity increases as pH decreases from 10 to 2 and again decreases at pH 11. It means that the membranes are stable at pH 2 to 10 and after that membrane stability decreases.

Example 33

Determination of the Oxidative Stability of the Membranes

Oxidative stability of the AEMs (AEM-1, AEM-4, AEM-5, AEM-6 and AEM-7 of Example 9, 20, 21, 22 and 23) were determined by placing in AEMs in water of TDS ppm. Fentons reagent (3 ppm $FeSO_4$ solution in 3% $H_2O_2$ solution) was added into the solution. The solution was kept at 80° C. for 10 h. Fresh $H_2O_2$ was added after each hour to ensure that the radicals do not exhaust. Highly reactive species like .OH and .OOH radicals were formed during reaction with Fentons reagent. The reactions are given below

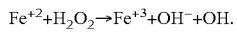

$Fe^{+2}+H_2O_2 \rightarrow Fe^{+3}+OH^-+OH.$

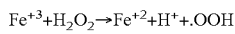

$Fe^{+3}+H_2O_2 \rightarrow Fe^{+2}+H^++.OOH$

After Fenton reagent test, ion exchange capacity, loss in weight and conductivity were measured. It has been found that there is very little loss of conductivity, wt and IEC even after boiling with fentons reagent for 10 hrs. This means that membranes are oxidatively stable.

TABLE 6

Change of $K^m$, weight and IEC of AEM-1, AEM-4, AEM-5, AEM-6 and AEM-7 after exposure with Fentons reagent at 80° C. for 10 h.

| Membranes | loss of $K_m$ (%) | Weight loss (%) | loss of IEC (%) |
| --- | --- | --- | --- |
| AEM-1 | 14 | 12 | 6 |
| AEM-4 | 9.8 | 8.8 | 3.5 |
| AEM-5 | 8.0 | 7.6 | 2.9 |
| AEM-6 | 5.3 | 6.1 | 2.1 |
| AEM-7 | 4.9 | 5.7 | 1.9 |

Advantages of Invention

1. Simple preparation route of AEMs from copolymers prepared by free radical copolymerization.
2. Preparation of AEMs by quaternization of tertiary amine group by use of methyl halide such as methyl iodide and methyl bromide thus avoiding the use of carcinogenic reagent which is necessary for the preparation of AEMs from polystyrene-based polymers.
3. Enhancement of membrane performance in terms of lower power consumption and high current efficiency by adjusting the composition of the membrane and by use of tercopolymer (PAN-co-PnBA-co-PDMA) instead of bicomponent (PAN-co-PDMA) copolymer.
4. The conventional process and hardware are utilized in the invention which would make adaptation of the invention straightforward.
5. There is no deliberate addition of any catalyst in the process.

We claim:
1. A process for the preparation of anion exchange membranes (AEM) comprising quaternized, cross linked copolymers, wherein said copolymers are poly(2-dimethylaminoethyl)methacrylate (PDMA) in the range of 7 to 42 wt % and polyacrylonitrile (PAN) in the range of 30 to 93 wt % and, optionally, poly-n-butyl acrylate (PnBA) in the range of 17 to 50 wt % if present, the process comprising the steps of:
   i. providing a copolymer synthesized by free radical polymerization;
   ii. treating the copolymer as provided in step (i) with an alkyl halide in the ratio ranging between 1 to 1.5 wt % in presence of dimethylformamide (DMF), followed by stirring at a temperature in the range of 30 to 50° C. for a period in the range of 12 to 24 hr to obtain quaternized copolymer;
   iii. treating the quaternized copolymer as obtained in step (ii) with a diamine in presence of DMF at a temperature in the range of 70 to 80° C. for a period in the range of 40 to 50 minute, followed by drying at a temperature in the range of 70 to 80° C. for a period in the range of 3-4 h to obtain the anion exchange membranes, wherein the copolymer of step (i) is selected from polyacrylonitrile (PAN)-co-poly(2-dimethylaminoethyl)methacrylate (PDMA) (PAN-co-PDMA) or polyacrylonitrile (PAN)-co-poly(2-dimethylaminoethyl)methacrylate (PDMA)-co-poly-n-butylacrylate (PnBA) (PAN-co-PDMA-co-PnBA), and wherein the diamine is selected from hydrazine hydrate, or ethylenediamine individually or in combination thereof.

2. The process as claimed in claim 1, wherein copolymer (PAN-co-PDMA) is prepared by free radical copolymerization of a mixture of acrylonitrile in the range of 72-70 wt % and dimethylaminoethyl methacrylate in the range of 28-30 wt % monomers.

3. The process as claimed in claim 1, wherein copolymer (PAN-co-PDMA-co-PNBA) is prepared by free radical copolymerization of mixture of acrylonitrile in the range of 49-55 wt %, dimethylaminoethyl methacrylate in the range of 28-33 wt % and n-butyl acrylate in the range of 17-18 wt % monomers.

4. The process as claimed in claim 1, wherein the alkyl halide is selected from methyl iodide and methyl bromide.

5. The process as claimed in claim 1, wherein the alkyl halide concentration is 4 to 10 mol % of poly(2-dimethylaminoethyl)methacrylate unit present in the respective copolymers for quaternization reaction.

6. The process as claimed in claim 1, wherein the diamine concentration is in the range of 15 to 40 wt % to PAN unit present in the copolymer for the cross-linking reaction.

* * * * *